United States Patent [19]

Yoshida et al.

[11] Patent Number: 5,702,510
[45] Date of Patent: Dec. 30, 1997

[54] AQUEOUS INK OF PIGMENT TYPE

[75] Inventors: Satoshi Yoshida; Hideki Yanagi; Kouichi Sakai; Masayoshi Nawa, all of Tochigi, Japan

[73] Assignee: Kao Corporation, Tokyo, Japan

[21] Appl. No.: 704,609

[22] PCT Filed: Dec. 15, 1995

[86] PCT No.: PCT/JP95/02582

§ 371 Date: Sep. 18, 1996

§ 102(e) Date: Sep. 18, 1996

[87] PCT Pub. No.: WO96/26248

PCT Pub. Date: Aug. 29, 1996

[30] Foreign Application Priority Data

Feb. 20, 1995 [JP] Japan ................... 7-031095

[51] Int. Cl.$^6$ ................................................ C09D 11/02
[52] U.S. Cl. ............... 106/31.6; 106/31.86; 106/31.89; 106/31.82
[58] Field of Search ..................... 106/20 R, 20 D, 106/31.86, 31.89, 31.82, 31.6

[56] References Cited

U.S. PATENT DOCUMENTS

| | | | |
|---|---|---|---|
| 5,180,425 | 1/1993 | Matrick et al. | 106/20 D |
| 5,232,494 | 8/1993 | Miller | 106/22 B |
| 5,326,388 | 7/1994 | Miller et al. | 106/22 B |
| 5,352,282 | 10/1994 | Miller | 106/22 B |
| 5,478,382 | 12/1995 | Miller et al. | 106/22 B |
| 5,486,228 | 1/1996 | Miller et al. | 106/22 B |

FOREIGN PATENT DOCUMENTS

| | | |
|---|---|---|
| 018468 | 1/1992 | Japan . |
| 213374 | 6/1992 | Japan . |
| 4-189876 | 8/1992 | Japan . |
| 5-9421 | 1/1993 | Japan . |
| 5-65443 | 3/1993 | Japan . |
| 148441 | 6/1993 | Japan . |
| 504576 | 5/1994 | Japan . |
| 061169 | 3/1995 | Japan . |

*Primary Examiner*—Helene Klemanski
*Attorney, Agent, or Firm*—Oblon, Spivak, McClelland, Maier & Neustadt, P.C.

[57] ABSTRACT

The aqueous ink of a pigment type comprises a pigment, water, a water-soluble solvent and a sulfite, and may further comprise a dispersant. An example of the dispersant comprises a copolymer of a monomer (a) represented by general formula (A), and one or more monomers (b) selected from the group consisting of compounds represented by general formulae (B) and (C):

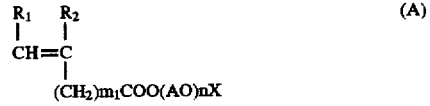

(A)

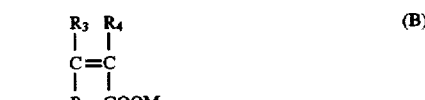

(B)

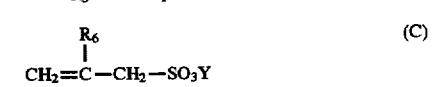

(C)

wherein AO represents an oxyalkylene group having 2 to 3 carbon atoms, and n represents an integer of 110 to 300.

12 Claims, No Drawings

AQUEOUS INK OF PIGMENT TYPE

TECHNICAL FIELD

The present invention relates to an aqueous ink of a pigment type, and more particularly to an aqueous ink of a pigment type capable of accomplishing the stability of jetting in ink jet printers and accomplishing printing without causing clogging, and to an ink jet recording method which uses the same.

BACKGROUND ART

For inks for printing and writing utensils, aqueous inks are used in many cases because of the easiness of their production and handleability. For example, due to the development and spread of computers of late years, printing apparatuses are also spread and aqueous inks are used popularly for such printing apparatuses. The ink jet recording technique that is one of typical recording techniques for printing apparatuses is a recording technique wherein ink droplets are expelled from a very small nozzle directly onto a recording medium to allow the ink droplets to impact to the recording medium thereby obtaining images including characters. Of late years, this technique is widely used because this technique has not only an advantage that the apparatus used is low in noise and good in operability but also an advantage that images can be colored easily and plain paper can be used as a recording medium. As techniques for jetting an ink, the piezo-electric technique which uses a piezo-electric element for a printing head and the thermal jet technique which uses a heater of a heating resistor element for a printing head are widely used for personal printers.

As inks used for the above-mentioned ink jet recording, inks of a dye type and pigment type are conventionally used. However, on the one hand the inks of a dye type are poor in water resistance and light resistance, and on the other hand the inks of a pigment type are poor in stability of jetting to cause a nozzle to be clogged, which are problems.

To solve the problem that causes a nozzle to be clogged with an ink, in the inks used for ink jet printers, generally a water-soluble dye that can be dissolved in water is used. However, by using a water-soluble dye, while the ink hardly clogs a nozzle, there are problems that the ink is poor in water resistance and light resistance and that, particularly in the case of a thermal jet technique, the dye is oxidized by excess heat at a printing head to cause the ink to be scorched easily onto the printing head.

Further, for the inks of a pigment type, in order to prevent the ink from clogging a nozzle, there have been proposed a method wherein a combination of a dispersant and a carbon black having a pH of 7 or over is used (Japanese Patent Application Laid-Open 4-189876), a method wherein a pigment is emulsified with a core material (Japanese Patent Application Laid-Open 5-9421), and a method wherein a pigment and insoluble resin particles are bonded with an organic silane coupling agent (Japanese Patent Application Laid-Open 5-65443), but they are not still satisfactory.

Therefore, an object of the present invention is to provide an aqueous ink of a pigment type capable of accomplishing the stability of jetting in ink jet printers as well as capable of accomplishing printing without causing clogging and excellent in water resistance and light resistance, and an ink jet recording method which uses the same.

DISCLOSURE OF INVENTION

The present inventors have made intensive research and have found that the above object can be attained by using a sulfite in an aqueous ink of a pigment type, leading to the completion of the invention.

That is, the present invention provides an aqueous ink of a pigment type comprising a pigment, water, a water-soluble solvent and a sulfite. The aqueous ink of a pigment type of the present invention is particularly suitable for use as an ink for an ink jet recording.

Further, the present invention provides an ink jet recording method in which the aqueous ink of a pigment type of the present invention is used, the method comprising jetting to a recording medium the aqueous ink of a pigment type of the present invention in a droplet form from a nozzle by the action of thermal energy generated by a heater, such as a heating resistor element, in a printing head, thereby producing an image on the recording medium.

BEST MODE FOR CARRYING OUT THE INVENTION

Now, the aqueous ink of a pigment type of the present invention will be described in detail.

As the pigment which is a major component of the aqueous ink of a pigment type of the present invention, any one can be used so long as it is a pigment. Examples of the pigment which can be used include carbon black; C.I. Pigment Yellow 1, 5, 12, 14, 17, 24, 42, 53, 83, 95, 97, 98 and 100; C.I. Pigment Red 1, 3, 4, 5, 17, 22, 31, 48, 49, 53, 63, 64, 81:1, 88 and 101; C.I. Pigment Blue 1, 15, 16, 27, 28, 29, 56, 60 and 63; and C.I. Pigment Black 1, 7 and 11, with carbon black being particularly preferred.

In the present invention, the term "pigment" refers to a solid in the form of fine particles that is insoluble in water, solvents, oils, and the like, whereas the term "dye" refers to one that can dye water or solvents when it is dissolved in water or the solvents. ["Color Chemical Jiten" (first impression, issued in March, 1988, edited by CMC KK, Yukigousei Kagakukyokai), pp. 45-].

Therefore, the pigment used in the present invention is different from dyes.

Water and a water-soluble solvent that are also major components of the aqueous ink of a pigment type of the present invention are used as solvents. Examples of the water soluble solvents which can be used include polyhydric alcohols and ethers thereof such as ethylene glycol, propylene glycol, diethylene glycol, triethylene glycol, polyethylene glycol, glycerin, ethylene glycol monoethyl ether, ethylene glycol monoethyl ether, ethylene glycol monobutyl ether, diethylene glycol diethyl ether, diethylene glycol monobutyl ether, triethylene glycol monomethyl ether, triethylene glycol monoethyl ether and propylene glycol monomethyl ether; acetates; and nitrogen-containing compounds such as N-methyl-2-pyrrolidone and 1,8-dimethylimidazolidinone. These water soluble solvents can be used singly or a combination of two or more thereof. The aqueous ink of a pigment type of the present invention contains, as major components the pigment, water, and the water-soluble solvent, and further contains a sulfite. Examples of salts of the sulfite include metal salts such as a sodium salt and a potassium salt; an alkaline earth metal salts such as a calcium salt and a magnesium salt; a quaternary ammonium salt; primary, secondary and tertiary alkylamine salts; and quaternary alkyl ammonium salts, with the sodium salt, the potassium salt and the quaternary ammonium salt being particularly preferred.

Further, in order to improve the dispersibility of the pigments, conventionally used dispersants can be added to the aqueous ink of a pigment type of the present invention.

Examples of the dispersants include anionic surface-active agents such as higher fatty acid salts, higher alkyldicarboxylates, higher alcohol sulfate salts, higher alkyl sulfonates, condensates of a higher fatty acid and an amino acid, sulfosuccinate salts, and naphthenates; cationic surface-active agents such as aliphatic amine salts, quaternary ammonium salts, sulfonium salts, and phosphonium salts; amphoteric surface-active agents such as betaine type compounds; and nonionic surface-active agents such as esters of an aliphatic acid and a polyoxyalkylene compound, and polyalkylene oxide condensates. These dispersants can be used singly or a combination of two or more thereof. Polymeric dispersants can be also used which include, for example, proteins such as gelatin and casein; natural rubbers such as gum arabic; glucoxide such as saponin; cellulose derivatives such as alkyl cellulose, carboxyalkyl cellulose and hydroxyalkyl cellulose; lignin sulfonate; natural polymers such as shellac; anionic polymers such as polyacrylate, styrene/acrylic acid copolymer salts, vinylnaphthalene/acrylic acid copolymer salts, styrene/maleic acid copolymer salts, vinylnaphthalene/maleic acid copolymer salts, sodium salts of β-naphthalenesulfonic acid/formaldehyde condensates, and polyphosphoric acids; and nonionic polymers such as polyvinyl alcohol, polyvinyl pyrrolidone, and polyalkylene glycol. These dispersants can be used singly or a combination of two or more thereof.

In view of dispersion stability and preservation stability, the dispersant that can be particularly preferably used in the present invention comprises a copolymer of a monomer (a) represented by general formula (A), and one or more monomers (b) selected from the group consisting of compounds represented by general formulae (B) and (C):

$$\begin{array}{cc} R_1 & R_2 \\ | & | \\ CH{=}C \\ | \\ (CH_2)_{m_1}COO(AO)_nX \end{array} \quad (A)$$

wherein $R_1$ and $R_2$, which may be the same or different, each represent a hydrogen atom or a methyl group, $m_1$ represents an integer of 0 to 2, AO represents an oxyalkylene group having 2 to 3 carbon atoms, n represents an integer of 110 to 300, and X represents a hydrogen atom or an alkyl group having 1 to 3 carbon atoms,

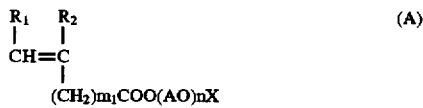

$$\begin{array}{cc} R_6 \\ | \\ CH_2{=}C{-}CH_2{-}SO_3Y \end{array} \quad (C)$$

wherein $R_3$, $R_4$ and $R_5$, which may be the same or different, each represent a hydrogen atom, a methyl group or $(CH_2)_{m_2}COOM_2$, $R_6$ represents a hydrogen atom or a methyl group, $M_1$, $M_2$ and Y, which may be the same or different, each represent a hydrogen atom, an alkali metal, an alkaline earth metal, ammonium, an alkylammonium or a substituted alkylammonium, $m_2$ represents an integer of 0 to 2, with the compounds represented by general formula (B) including acid anhydrides thereof.

Herein, in general formula (A), $R_1$ and $R_2$, which may be the same or different, each represent a hydrogen atom or a methyl group. In particular, it is preferred that both $R_1$ and $R_2$ are the same and represent a hydrogen atom, or alternatively that $R_1$ represents a hydrogen atom and $R_2$ represents a methyl group. Further, $m_1$ represents an integer of 0 to 2, preferably 0 to 1. Further, AO represents an oxyalkylene group having 2 to 3 carbon atoms, preferably an oxyethylene group having 2 carbon atoms. Further, n represents an integer of 110 to 300, preferably an integer of 110 to 200. Further, X represents a hydrogen atom or an alkyl group having 1 to 3 carbon atoms, preferably a hydrogen atom, a methyl group or an ethyl group.

Specific examples of the preferred compounds represented by general formula (A) include esterified compounds of a polyalkylene glycol in which one terminal thereof is blocked with an alkyl group, such as methoxypolyethylene glycol, methoxypolyethylene polypropylene glycol, ethoxypolyethylene glycol, ethoxypolyethylene polypropylene glycol, propoxypolyethylene glycol, and propoxypolyethylene polypropylene glycol, with acrylic acid, methacrylic acid or a dehydrogenated (oxidized) reaction product of a fatty acid; and adducts of ethylene oxide or propylene oxide to acrylic acid, methacrylic acid, or a dehydrogenated (oxidized) reaction product of a fatty acid. With respect to the adducts of ethylene oxide and propylene oxide, any of random adducts, block adducts or alternating adducts can be used.

Specific examples of the preferred compounds represented by general formula (B) include acrylic acid, methacrylic acid, crotonic acid, metal salts thereof, and unsaturated dicarboxylic acid monomers such as maleic anhydride, maleic acid, itaconic anhydride, itaconic acid, citraconic anhydride, citraconic acid, fumaric acid, or alkaline metal salts, alkaline earth metal salts, ammonium salts, and amine salts thereof.

Specific examples of the preferred compound represented by formula (C) include allylsulfonic acid, methallylsulfonic acid, or alkaline metal salts, alkaline earth metal salts, ammonium salts, and amine salts thereof.

The preparation method of the copolymers is not particularly limited so long as the function of the obtained copolymer as a dispersant is not impaired, and conventionally known preparation methods can be mentioned as examples. Specific examples include solvent polymerization methods described in Japanese Patent Application Laid-Open 59-162163, Japanese Patent Publication 2-11542, Japanese Patent Publication 2-7901, and Japanese Patent Publication 2-7897.

The copolymer is preferably has a molar ratio of the monomers [the monomer (a)/the monomer (b)] of from 0.1/100 to 100/100.

Further, out of the copolymers, a copolymer of a polyalkylene glycol monoester monomer in which preferably 110 to 300 mol, more preferably 110 to 200 mol, of oxyalkylene groups having 2 carbon atoms are introduced, and an acrylic acid monomer is particularly desirable in view of the dispersibility and dispersion stability of pigments.

Other components including conventionally known various additives such as a mildewproofing agent and/or a chelate agent may be added to the aqueous ink of a pigment type of the present invention.

Although the formulation of the aqueous ink of a pigment type of the present invention is not particularly limited, generally the components are formulated in the following ranges on the basis of the total weight of the ink of the present invention:

| | |
|---|---|
| Pigment: | 1 to 20% by weight, preferably 2 to 10 % by weight |
| Sulfite: | 0.1 to 10% by weight, preferably 1 to 5 % by weight |
| Water-soluble solvent: | 1 to 20% by weight, preferably 5 to 10% by weight |
| Dispersant: | 0.3 to 30% by weight, preferably 1 to 15 % by weight |
| Other components: | 1 to 10% by weight |
| Water: | 40 to 97.6% by weight, preferably 75 to 92% by weight |

In the aqueous ink of a pigment type of the present invention, the weight ratio of the pigment to the sulfite (the pigment/the sulfite) is generally from 1/10 to 10/1, preferably from 1/3 to 3/1. If the weight ratio is less than 1/10, the dispersibility of the pigment may be impaired whereas when the weight ratio is over 10/1, the jetting of the ink may become unstabilized.

In the aqueous ink of a pigment type of the present invention, when a dispersant is used, the weight ratio of the pigment to the dispersant (the pigment/the dispersant) is generally from 1/10 to 10/1, preferably from 1/5 to 5/1, more preferably from 1/3 to 3/1.

The preparation method of the aqueous ink of a pigment type of the present invention by mixing the above-mentioned components is not particularly limited. The components can be mixed by using a conventionally known apparatus such as a ball mill, a sand mill, an attritor, a basket mill and a roll mill.

In the preparation of the aqueous ink of a pigment type of the present invention, it is preferable to remove coarse particles. For instance, an ink that does not cause clogging can be obtained by subjecting the ink obtained after formulation to a centrifugal machine to remove particles preferably of 2,000 nm or more in size, more preferably of 1,000 nm of more in size.

The viscosity of the thus obtained aqueous ink of a pigment type of the present invention is generally 1 to 10 cps, preferably 1 to 5 cps, in view of the stability of jetting.

The surface tension of the aqueous ink of a pigment type of the present invention is generally 25 to 30 dyn/cm, preferably 30 to 45 dyn/cm, in view of the permeability into the material to be printed.

The amount of dissolved oxygen in the aqueous ink of a pigment type of the present invention is generally 0.012 to 0.016 ml/ml, preferably 0.012 to 0.014 ml/ml, in view of the stability of jetting.

The aqueous ink of a pigment type of the present invention is suitable for ink jet recording, and when it is used for ink jet recording, any printer that employs the ink jet recording system can be used. For example, any of printers that employ the piezo-electric recording technique that utilizes a piezo-electric element for a printing head and printers that employ the thermal jet recording technique that utilizes thermal energy generated by a heating resistor element in the printing head or the like can be used.

Particularly, the aqueous ink of a pigment type of the present invention is suitably used for the thermal jet recording technique that utilizes thermal energy to jet the ink in a droplet form from a nozzle to a recording medium, and a heating resistor element is suitably used as a source of the thermal energy. Further, the aqueous ink of a pigment type of the present invention can be used as an aqueous ink of a pigment type for ink jet recording as mentioned above and in addition as an ink for usual writing utensils, such as fountain pens, ball-point pens, Magic Markers, and felt-tipped pens.

In the aqueous ink of a pigment type of the present invention, the incorporation of the pigment and the sulfite, preferably the pigment, the sulfite, and the dispersant, can accomplish the stability of jetting the ink, particularly when printing is carried out by using an ink jet printer. Although the reason is not sufficiently clear, it can be considered as follows.

That is, it is assumed that the sulfite reacts with oxygen in the ink to reduce the amount of air (oxygen) dissolved in the ink to stabilize the jetting of the ink jet printer.

In particular, in the case where a dispersant, particularly the above specific dispersant, is used, the dispersant is adsorbed to the pigment, so that air (oxygen) adsorbed to the pigment is freed into the ink. It is assumed that the freed air (oxygen) reacts with the sulfite to reduce further the amount of air dissolved in the ink and therefore the jetting of the ink jet printer is further stabilized. Inter alia, in the case where the thermal jet recording technique is used, the generation of bubbles required in the ink jetting is further stabilized and therefore the jetting of the ink is further stabilized.

Thus, in the aqueous ink of a pigment type of the present invention, the use of the sulfite, preferably the use of the sulfite and a dispersant, in particular the above-mentioned specific dispersant, exhibits, particularly when printing is carried out by using an ink jet printer, an excellent effect that cannot be obtained in the case of conventional inks for recording.

The advantages of the present invention will now be illustrated with reference to Examples below, but of course the present invention is not limited to them. Parenthetically, in the following Examples, all the parts represent parts by weight unless otherwise stated.

EXAMPLE 1

| | |
|---|---|
| Carbon black: | 15 parts |
| Condensate of naphthalenesulfonate: (Demol N manufactured by Kao Corporation) | 3 parts |
| Monoethanolamine: | 1 part |
| Diethylene glycol: | 5 parts |
| Ion exchanged water: | 76 parts |

The above components were dispersed for 4 hours by a sand mill to obtain Dispersion A.

| | |
|---|---|
| Dispersion A: | 33 parts |
| Sodium sulfite: | 2 parts |
| Diethylene glycol: | 4 parts |
| Ion exchanged water: | 61 parts |

After the components were formulated, the formulation was processed by a centrifugal machine at 4,000 rpm for 20 min to remove coarse particles thereby obtaining an ink. This ink was used for printing by using a thermal jet printer BJ-10 Lite manufactured by Canon Inc. that employed a heater of a heating resistor element as a source of the thermal energy, and good printed images were obtained. Further, it was found that these printed images were excellent in water resistance and light resistance.

EXAMPLE 2

| C.I. Pigment Red 81:1: | 15 parts |
|---|---|
| Condensate of naphtahlenesulfonate: (Demol N manufactured by Kao Corporation) | 3 parts |
| Monoethanolamine: | 1 part |
| Diethylene glycol: | 5 parts |
| Ion exchanged water: | 76 parts |

The above components were dispersed for 4 hours by a sand mill to obtain Dispersion B.

| Dispersion B: | 33 parts |
|---|---|
| Sodium sulfite: | 2 parts |
| Diethylene glycol: | 4 parts |
| Ion exchanged water: | 61 parts |

After the components were formulated, the formulation method shown in Example 1 was followed to obtain an ink. When this ink was used for printing in the same manner as in Example 1, good printed images were obtained. Further it was found that these printed images were excellent in water resistance and light resistance.

EXAMPLE 3

| C.I. Pigment Blue 15:1: | 15 parts |
|---|---|
| Copolymer of polyethylene glycol monoacrylate in which 130 mol of oxyethylene groups were introduced, and sodium acrylate [the molar ratio of the monomers (the former the latter) = 3/7]: | 4 parts |
| Monoethanolamine: | 1 part |
| Diethylene glycol: | 6 parts |
| Ion exchanged water: | 74 parts |

The components were dispersed for 4 hours by a sand mill to obtain Dispersion C.

| Dispersion C: | 33 parts |
|---|---|
| Sodium sulfite: | 2 parts |
| Diethylene glycol: | 6 parts |
| Ion exchanged water: | 59 parts |

After the components were formulated, the preparation method shown in Example 1 was followed to obtain an ink. The ink was particularly excellent in dispersibility and dispersion stability. When this ink was used for printing in the same manner as in Example 1, good printed images were obtained. Further it was found that these printed images were excellent in water resistance and light resistance.

Comparative Example 1

| Dispersion A: | 33 parts |
|---|---|
| Diethylene glycol: | 4 parts |
| Ion exchanged water: | 63 parts |

After the components were formulated, the preparation method shown in Example 1 was followed to obtain an ink. When this ink was used for printing in the same manner as in Example 1, the jetting was not stabilized.

Comparative Example 2

| Food Black 2 (dye): | 5 parts |
|---|---|
| Diethylene glycol: | 5 parts |
| Monoethanolamine: | 1 part |
| Sodium sulfite: | 2 parts |
| Ion exchanged water: | 87 parts |

After the components were formulated, the preparation method shown in Example 1 was followed to obtain an ink of a dye type. When this ink was used for printing in the same manner as in Example 1, although good printed images were obtained, the printed images were poor in water resistance and light resistance.

As is apparent from the above results, the aqueous ink of a pigment type of the present invention realizes an aqueous ink of a pigment type that can accomplish the stability of jetting and printing without causing clogging particularly when printing is carried out by using an ink jet printer, and therefore the intended object is well attained. The aqueous ink of a pigment type of the present invention exhibits an excellent effect particularly when printing is carried out by using a thermal jet type ink jet printer.

INDUSTRIAL APPLICABILITY

The aqueous ink of a pigment type of the present invention is suitably used particularly as an aqueous ink of a pigment type for ink jet recording, accomplishes the stability of jetting in ink jet printers and printing by ink jet printers without causing clogging, and is excellent in water resistance and light resistance. Further, the aqueous ink of a pigment type of the present invention accomplishes printing without causing clogging by removing coarse particles in the preparation. Further, according to the present invention, when the aqueous ink of a pigment type of the present invention is used in a thermal jet method in which thermal energy generated by a heater such as a heating resistor element is used, stabilized jetting can be secured even if the printing is carried out at a high drive frequency.

Further, the printed material in which the aqueous ink of a pigment type of the present invention has been used is excellent in water resistance and light resistance in comparison with the printed material in which inks of a dye type have been used.

We claim:

1. An aqueous ink, comprising:
a pigment, water, a water-soluble solvent, a sulfite and a dispersant which is member selected from the group consisting of an anionic surface-active agent, a cationic surface-active agent, an amphoteric surface-active agent, a nonionic surface-active agent, protein, a natural rubber, a glucoxide, a cellulose derivative, a lignin, sulfonate, a natural polymer, a nonioinic polymer and a copolymer of a monomer (a), represented by the formula (A), and one or more monomers (b) selected from the group consisting of compounds represented by formulae (B) and (C):

wherein $R_1$, and $R_2$, which may be the same or different, each represent a hydrogen atom or a methyl group, $m_1$ represents an integer of 0 to 2, AO represents an oxyalkylene group having 2 to 3 carbon atoms, n represents an integer of 110 to 300, and X represents a hydrogen atom or an alkyl group having 1 to 3 carbon atoms,

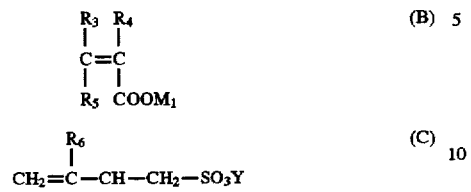

wherein $R_3$, $R_4$ and $R_5$, which may be the same or different, each represent a hydrogen atom or a methyl group or $(CH_2)m_2COOM_2$, $R_6$ represents a hydrogen atom, a methyl group, $M_1$, $M_2$ and Y, which may be the same or different, each represent a hydrogen atom, an alkali metal, an alkaline earth metal, ammonium, an alkylammonium or a substituted alkylammonium, $m_2$ represents an integer of 0 to 2, with the compounds represented by the general formula (B) including acid anhydrides thereof, wherein the weight ratio of pigment to sulfite ranges from 1/10 to 10/1.

2. The aqueous ink as claimed in claim 1, wherein the copolymer is a copolymer of a polyalkylene glycol monoester monomer in which 110 to 300 mol of oxyalkylene groups having 2 carbon atoms are introduced, and an acrylic acid monomer.

3. The aqueous ink as claimed in claim 1, wherein said water-soluble solvent is a polyhydric alcohol.

4. The aqueous ink as claimed in claim 1, wherein said pigment/sulfite ratio ranges from 1/3 to 3/1.

5. The aqueous ink as claimed in claim 1, wherein the weight ratio of the pigment to the dispersant ranges from 1/10 to 10/1.

6. The aqueous ink as claimed in claim 1, wherein said aqueous ink is a pigmented ink for ink jet recording.

7. The aqueous ink as claimed in claim 1, which has a viscosity within the range of 1 to 10 cps.

8. The aqueous ink as claimed in claim 1, which has a surface tension within the range of 25 to 50 dyn/cm.

9. The aqueous ink as claimed in claim 1, which has dissolved oxygen content within the range of 0.012 to 0.016 ml/ml.

10. A method of ink jet recording, comprising:

jetting the aqueous ink of claim 1 in droplet form from a nozzle to a recording medium by the action of thermal energy, thereby producing an image on the recording medium.

11. The method of claim 10, wherein said thermal energy is applied by a heat generating resistor element.

12. An aqueous ink for ink jet recording, consisting essentially of:

1 to 20% by weight of a pigment, 40 to 97.6% by weight of water, 1 to 20% by weight of water-soluble solvent, 0.1 to 10% by weight of a sulfite, 0.3 to 30% by weight of dispersant and 1 to 10% by weight of other components.

* * * * *